United States Patent
Lin

(10) Patent No.: US 6,791,068 B2
(45) Date of Patent: Sep. 14, 2004

(54) ROLLER HEATING SYSTEM FOR A LAMINATING MACHINE AND PROCESS FOR PRODUCING ROLLING SHAFT THEREOF

(75) Inventor: Shin-Fu Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 85 days.

(21) Appl. No.: 10/128,413

(22) Filed: Apr. 24, 2002

(65) Prior Publication Data

US 2003/0102300 A1 Jun. 5, 2003

(30) Foreign Application Priority Data

Nov. 30, 2001 (TW) ........................................ 90129683 A

(51) Int. Cl.$^7$ ............................. H05B 3/00; B32B 3/00
(52) U.S. Cl. ........................ 219/469; 219/244; 492/46; 156/583.1
(58) Field of Search ................................ 219/244, 469; 492/46; 156/359, 382, 555, 583.1

(56) References Cited

U.S. PATENT DOCUMENTS

| | | | | |
|---|---|---|---|---|
| 5,081,340 A | * | 1/1992 | Levitan | 219/469 |
| 5,235,163 A | * | 8/1993 | Levitan | 219/469 |
| 5,821,499 A | * | 10/1998 | Crimmins et al. | 219/469 |
| 5,869,808 A | * | 2/1999 | Hyllberg | 219/469 |
| 5,990,458 A | * | 11/1999 | Hyllberg et al. | 219/469 |
| 6,191,395 B1 | * | 2/2001 | Kasai et al. | 219/469 |
| 6,649,880 B2 | * | 11/2003 | Yue | 219/469 |
| 2002/0157782 A1 | * | 10/2002 | Maes | 156/582 |

* cited by examiner

*Primary Examiner*—Joseph Pelham
(74) *Attorney, Agent, or Firm*—Troxell Law Office PLLC

(57) ABSTRACT

A roller heating system for a laminating machine comprises a first rolling shaft and a second rolling shaft, wherein the first rolling shaft and the second rolling shaft are parallel with each other, and a heating mechanism is mounted on the respective surface of the two rolling shafts. Then, a heat conduction layer wraps up the respective surface of the above-mentioned rolling shafts as well as the heating mechanisms. When the lamination proceeds, the heat mechanisms firstly heat the heat conduction layers to a working temperature and at the same time, the first and second rolling shafts respectively rotate in a predetermined direction, and then an article covered with laminating plastic films is fed into the roller heating system. The heat conduction layers heat the laminating plastic films to melt the fusion gum of the inner surfaces of the laminating plastic films, and subsequently the laminating plastic films are forced by the compression of the first and second rolling shafts to adhere to the article. Hence, not only good temperature control can be achieved and the lamination quality of the article can be ensured, but also the preheating time of the laminating machine can be shortened and the mechanical construction thereof can be simplified.

14 Claims, 7 Drawing Sheets

ROLLER HEATING SYSTEM FOR A LAMINATING MACHINE AND PROCESS FOR PRODUCING ROLLING SHAFT THEREOF

FIELD OF THE INVENTION

The present invention relates to a roller heating system for a lamination machine and a process for producing the rolling shaft thereof, more particularly, to a rubber rolling shaft with electric heating wires, which can simplify the heating structures of the lamination machine and shorten the preheating time required for the laminating machine.

BACKGROUND OF THE INVENTION

In the past, various sizes of files were required to keep important documents such as papers and letters, etc. However, these valuable documentary papers or vouchers are almost paper products and thus are liable to be ruined after repeated utilization and damage of vapor and smuts, etc. in the environment. Moreover, memorable photographs are frequently touched or repeatedly taken out from photo albums, and thus the quality of the photo pictures suffers deterioration.

In order to prevent these documents from damage caused by natural or man-made factors, a general method for protecting/maintaining these documents is to laminate a layer of plastic film onto the paper documents with the employment of a laminating machine. The layer of laminating plastic film, usually made of a transparent plastic material, not only provides protection for these paper products from water and dirt, but also avoids wear and tear in use so that the photographs, certificates and so on can be properly preserved.

Please refer to FIG. 1, which is a schematic diagram of the construction of a laminating machine in the prior art. The conventional laminating machine mainly includes a heating device 10 and a pair of rollers 11, wherein the heating device 10 is constructed by mounting a pair of electrical heaters 13 respectively in a recess 15 of a set of thin aluminum plate means 12 and constraining the electrical heaters 13 respectively in the recess 15 by a pair of press plates 14.

Referring to FIG. 2, which is a schematic working diagram of the conventional laminating machine, when the conventional laminating machine proceeds with pressurizing lamination of a desired article 20 by the pair of rollers 11, the set of thin aluminum plate means 12 are preheated by the pair of electrical heaters 13. After the set of thin aluminum plate means 12 are heated to a working temperature, the top and bottom surfaces of the desired article 20 are respectively covered with one layer of laminating plastic film 21 and are fed to the heating device 10 in a direction 22 to be heated. During heating, the fusion gum of the inner surface of the laminating plastic film 21 become molten and viscous, and the article 20 covered with the layers of the laminating plastic film 21 is then immediately fed in between the pair of rollers 11. The laminating plastic films 21 are compressed by the set of rollers 11 to bond onto the article 20.

However, such a laminating machine needs a longer preheating time because the set of thin aluminum plate means 12 are required to be firstly preheated to the working temperature before lamination; otherwise the fusion gum of the inner surface of the laminating plastic film 21 would not get molten and viscous, and then the laminating plastic film 21 is unable to adhere onto the article desired for lamination. Furthermore, such a laminating machine is incapable of controlling its ambient temperature since the laminating plastic film 21 after heated is transmitted through a travel distance out of the set of thin aluminum plate means 12, and then arrives to the set of rollers 11 for lamination. Within this travel distance, the ambient temperature would affect the adhesion state of the laminating plastic film 2. If the ambient temperature in the vicinity of the heating device 10 is much higher, it leads to early cohesion of part of the laminating plastic film 21 onto the article before the compression of the set of rollers 11. Blisters would form or ruggedness would produce between the laminating plastic film 21 and the surface of such a laminated document, photo and so forth. On the other hand, if the ambient temperature in the vicinity of the heating device 10 is far lower, it will cause the fusion gum of the inner surface of the laminating plastic film 21 unable to melt and thus the laminating plastic film 21 cannot adhere to the article desired for lamination.

In addition, the conventional heating device 10 is constructed by several elements, which is not only complicate in assembly and occupies much space, but also increases the manufacturing costs and the assembling labor. As a result of the above-mentioned drawbacks, there is a need for an innovative heating mechanism of a laminating machine to simplify the process of manufacture, to shorten the preheating time required for lamination, and further to provide excellent lamination quality.

SUMMARY OF THE INVENTION

The primary objective of the present invention is to provide a roller heating system for a laminating machine and a process for producing the thereof, which system can heat a laminating plastic film and simultaneously compress the laminating plastic film so that the temperature of the laminating plastic film is well-controlled to ensure a good lamination quality of an article.

Another objective of the present invention is to provide a roller heating system for a laminating machine and a process for producing the thereof, wherein a heating mechanism is directly mounted on the surface of a pair of rollers so as to shorten the required preheating time of the laminating machine.

A further objective of the present invention is to provide a roller heating system for a laminating machine and a process for producing the thereof, which system combines the heating mechanism and the pair of rollers thereof so as to simplify the assemblies of the laminating machine and to diminish the integral volume thereof.

In one embodiment of this invention, the roller heating system for a laminating machine comprises a pair of rollers constructed by a first rolling shaft and a second rolling shaft, wherein the first rolling shaft and the second rolling shaft are parallel with each other. Moreover, a heating mechanism is mounted on the respective surface of the two rolling shafts, and then a heat conduction layer wraps up the respective surface of the above-mentioned rolling shafts as well as the heating mechanisms.

While the roller heating system proceeds with lamination, the heat mechanisms firstly heat the heat conduction layers on the first and second rolling shafts to a working temperature. At the same time, the first and second rolling shafts respectively rotate in a predetermined direction. An article covered with the laminating plastic films is subsequently fed into the roller heating system, and the heat conduction layers on the first and second rolling shafts heat the laminating plastic films to melt the fusion gum of the inner surfaces of the laminating plastic films. Then, the laminating plastic films with the fusion gum are forced by the compression of the first and second rolling shafts to adhere to the article desired for lamination.

Furthermore, the heating mechanism is an electric heating wire and the electric heating wire is uniformly screw wound onto the first and second rolling shafts so that the heat conduction layers can have a uniform surface temperature. Besides, in order to electrically connect the electric heating wire with a power source, an erection hole is mounted on the respective lateral end of the first and second rolling shafts and the two ends of the electric heating wires respectively penetrate through the respective erection hole and respectively connect with a respective power junction at the respective axle center of the first and second rolling shafts. Afterwards, the power junction 37 has a flexible contact with a brush and the brush is electrically connected to the power source.

The brush is constructed by a metal frame and a flexible thin metal plate. The flexible thin metal plate is mounted on the metal frame and a power joint is mounted on the metal frame and is electrically connected to the power source by a wire. The power supplied from the power source is transferred through the wire and the metal frame to the flexible thin metal plate, and then the power is transferred in a contact manner through the flexible thin metal plate to the power junction at the axle center of the rolling shaft.

In another embodiment of this invention, the first and second rolling shafts are made of metal materials, and in order to prevent short-circuiting resulted from contact of the heating mechanism (i.e. the electric heating wire) with the metal rolling shafts, an insulating layer is between the metal rolling shaft and the heating mechanism. The silicon rubber is used as the insulating layer in this embodiment.

In the roller heating system, a first driver and a second driver are respectively mounted at the ends of the first and second rolling shafts of the roller heating system, and the first driver is connected to a motor which provides the first driver with a dynamic force and the dynamic force is passed to the second driver through the first driver in such a way that the first and second rolling shafts rotate synchronously.

In addition, the first driver and the second driver are respectively a set of variable speed gears for modulating the speed and direction of rotation outputted from the motor, and the rotation direction of the first rolling shaft is opposite to that of the second rolling shaft. The first driver and the second driver are respectively mounted at the ends of the first rolling shaft and the second rolling shaft in such a way that the heat conduction layers respectively on the first and second rolling shafts interact with each other to produce a predetermined level of interferences so as to provide sufficient friction and compression to facilitate feeding and laminating the laminating plastic films.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A roller heating system for a laminating machine of this invention is disclosed, wherein a heating mechanism is mounted on the surface of the roller. Such a roller heating system not only can simplify the heating structures of the laminating machine, but also can achieve superior temperature control and shorten the preheating time. The detailed description is given as following.

Figure 1:
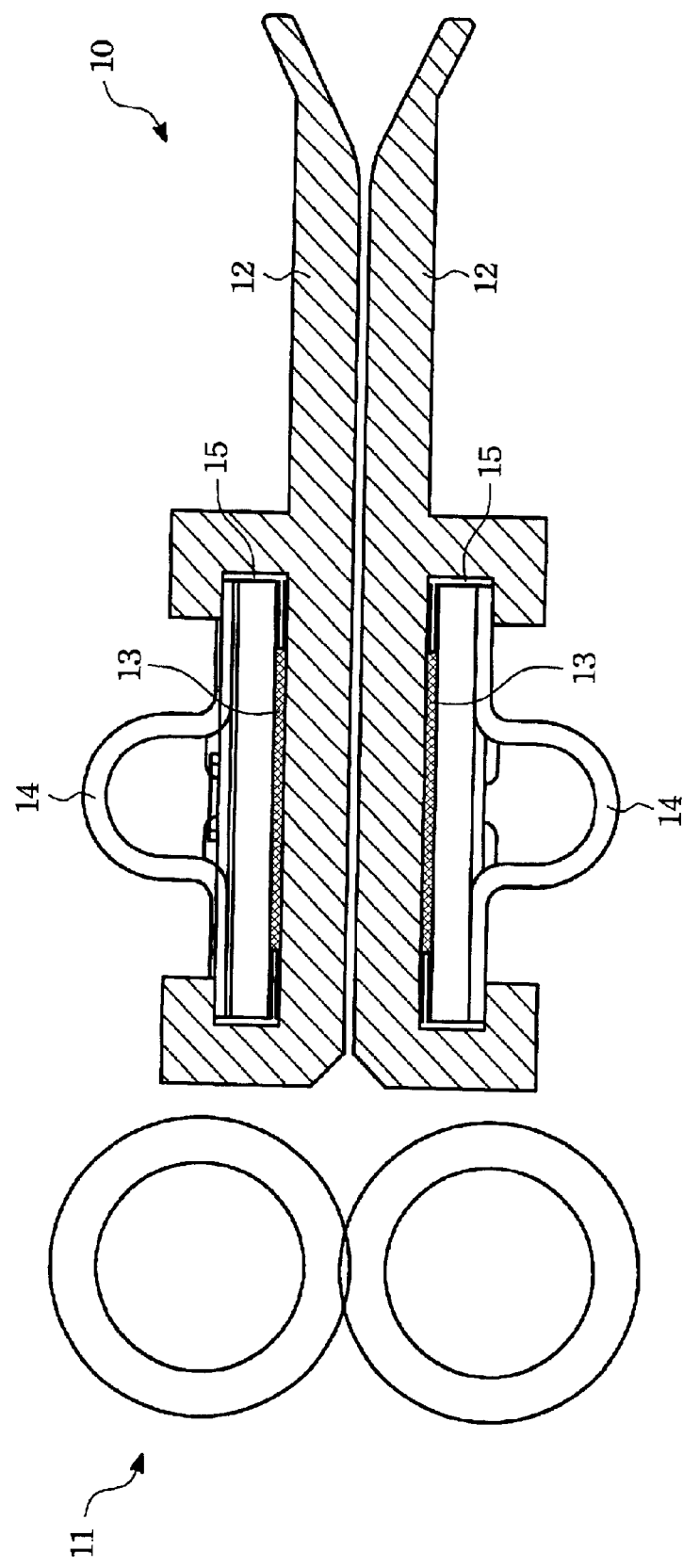
FIG. 1 is a schematic diagram of the construction of a laminating machine in the prior art.
Figure 2:
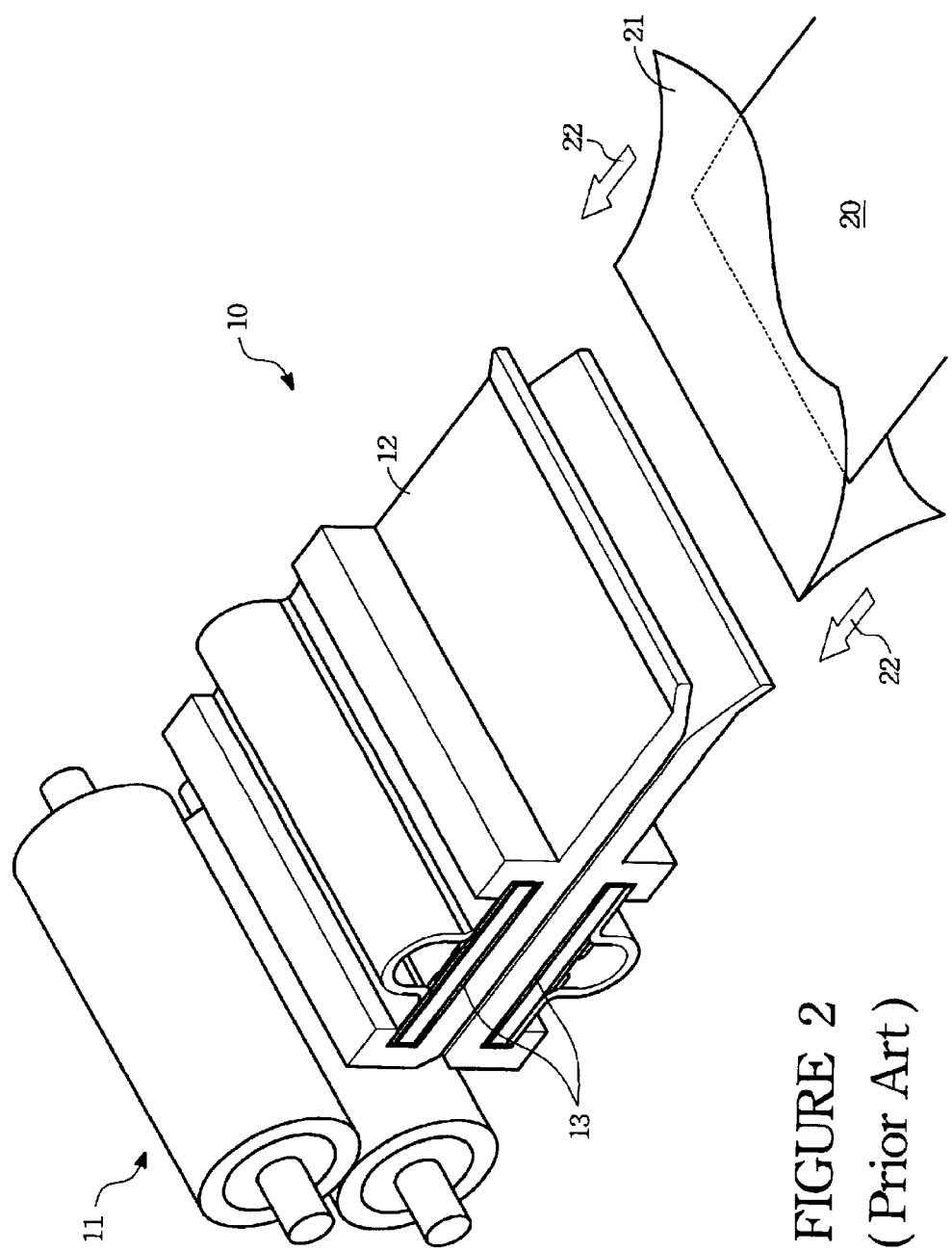
FIG. 2 is a schematic working diagram of the conventional laminating machine.
Figure 3A:
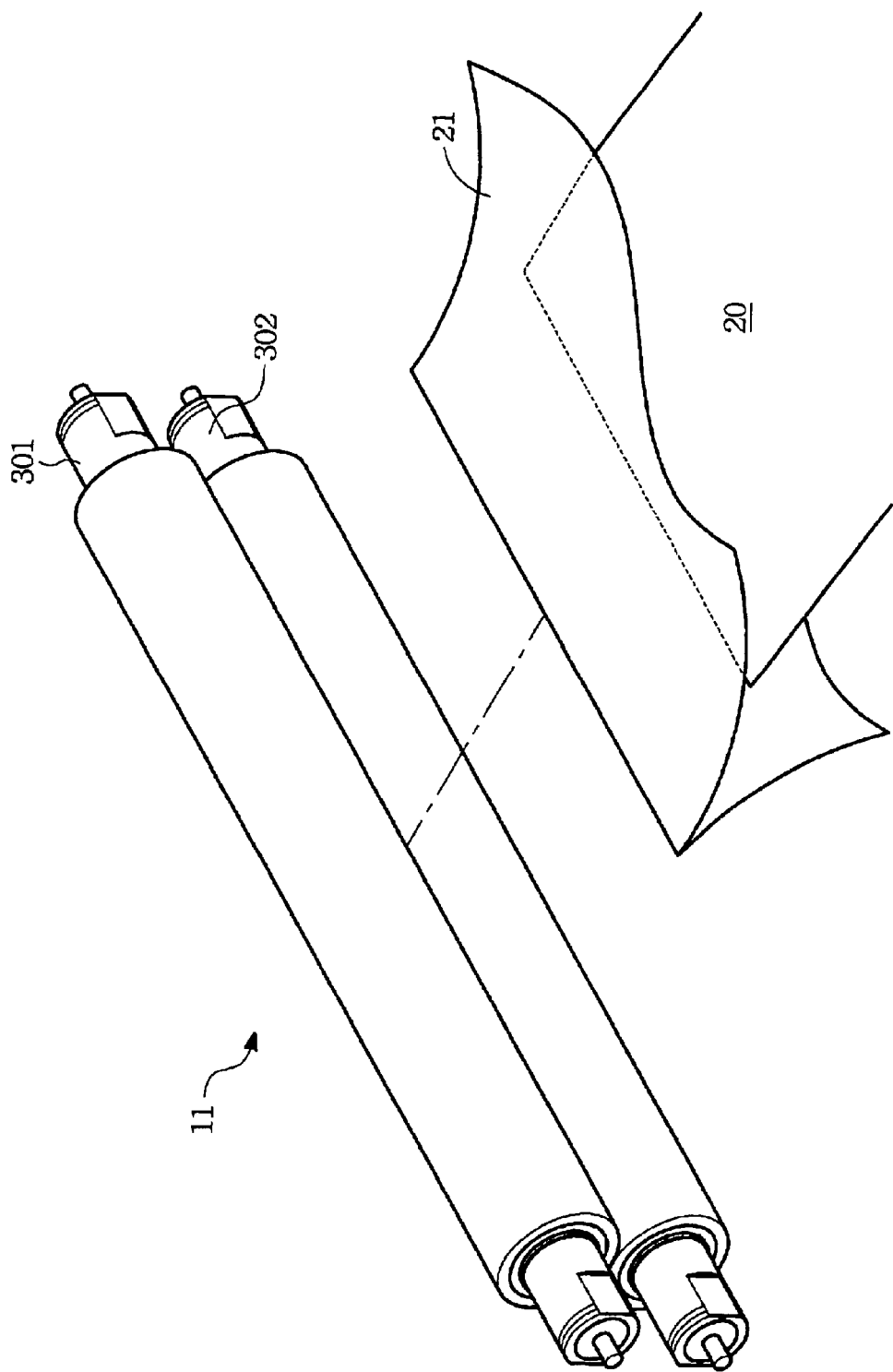
FIG. 3A is a schematic construction diagram of a roller heating system in accordance with the present invention.
Figure 3B:
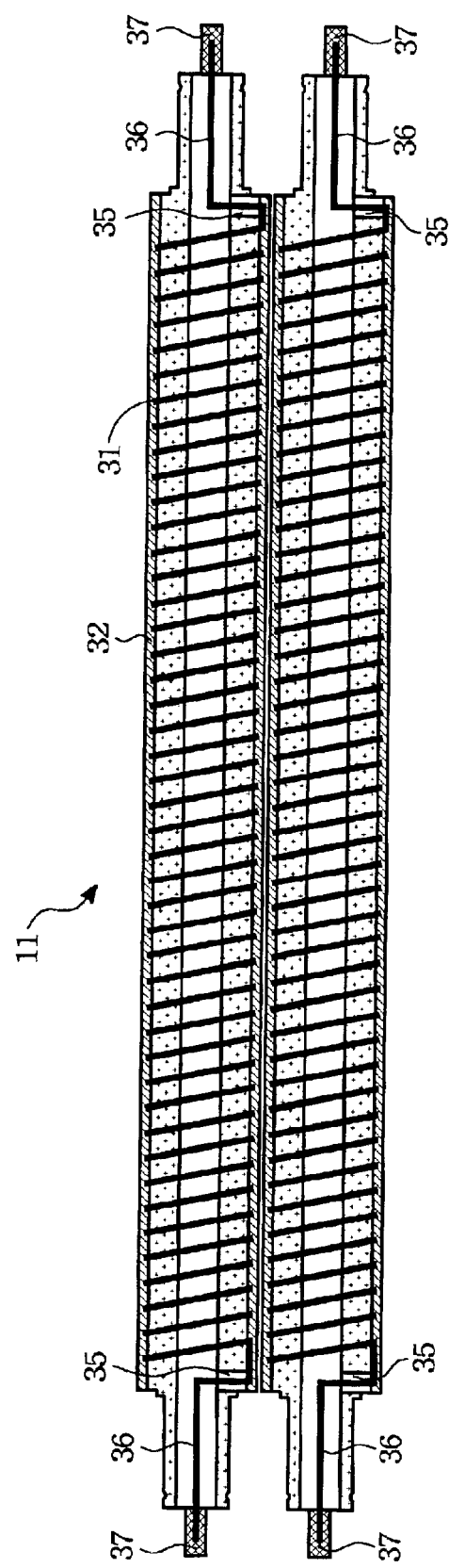
FIG. 3B is a cross-sectional view of the roller heating system in accordance with the present invention.

Please refer to FIGS. 3A and 3B, which are respectively a schematic construction diagram and a cross-sectional view of the roller heating system of this invention. The roller heating system for a laminating machine mainly includes a pair of rollers 11 which are constructed by a first rolling shaft 301 and a second rolling shaft 302 made of hard plastic materials; wherein the first rolling shaft 301 and the second rolling shaft 302 are arranged up and down respectively and are parallel with each other. Moreover, an electric heating wire 31 is mounted on the respective surface of the two rolling shafts 301, 302, and then the first and second rolling shafts 301, 302 wound with the electric heating wires 31 are respectively wrapped up by a heat conduction layer 32 which can provide a smooth and uniform contact surface for heat conduction and compression so as to facilitate subsequent lamination of a laminating plastic film 21. The heat conduction layer 32 employed in this embodiment is heat resistance rubber or silicon rubber.

While the roller heating system proceeds with lamination, the electric heating wires 31 firstly heat the heat conduction layers 32 of the first and second rolling shafts 301 and 302 to a working temperature. At the same time, the first and second rolling shafts 301 and 302 cooperate with each other and respectively rotate in an opposite direction. Then, an article 20 covered with the laminating plastic films 21 is fed into the roller heating system, and the heat conduction layers 32 on the first and second rolling shafts 301 and 302 heat the laminating plastic films 21 to melt the fusion gum of the inner surfaces of the laminating plastic films 21. Furthermore, while the first and second rolling shafts 301 and 302 heat the laminating plastic films 21, the laminating plastic films 21 are forced by the compression to adhere to the article 20 desired for lamination.

Figure 4:
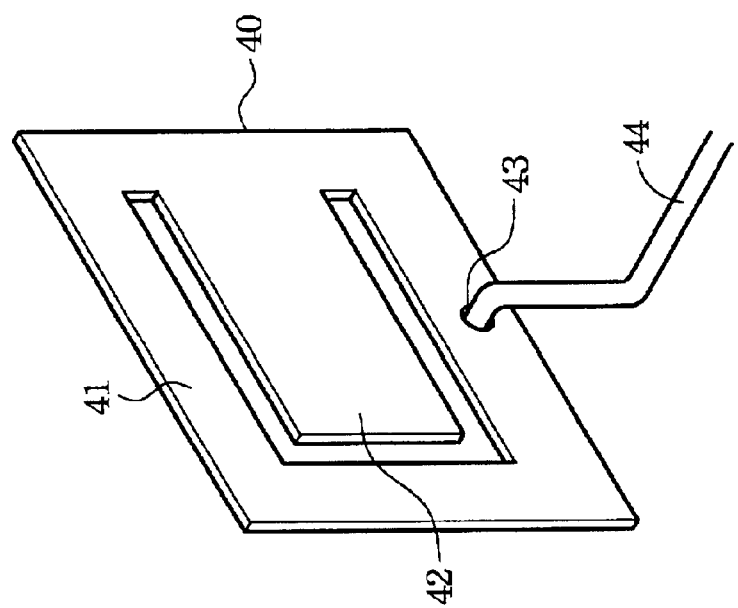
FIG. 4 is a schematic diagram of a brush structure in accordance with the present invention.

The steps of the process for producing the first and second rolling shafts 301 and 302 with the electric heating wires 31 mounted thereon are that the electric heating wires 31 are respectively screw wound, preferably in an equal spacing, from one respective end of the first and second rolling shaft to the other respective end thereof; subsequently, the two ends 36 of the electric heating wires 31 respectively penetrate through an respective erection hole 35 mounted on the respective lateral end of the first and second rolling shafts 301 and 302 and respectively connect with a respective power junction 37 at the respective axle center of the first and second rolling shafts; and finally, the power junction 37 has a flexible contact with a brush 40 (as shown in FIG. 4) and is electrically connected to a power source.

Figure 5:
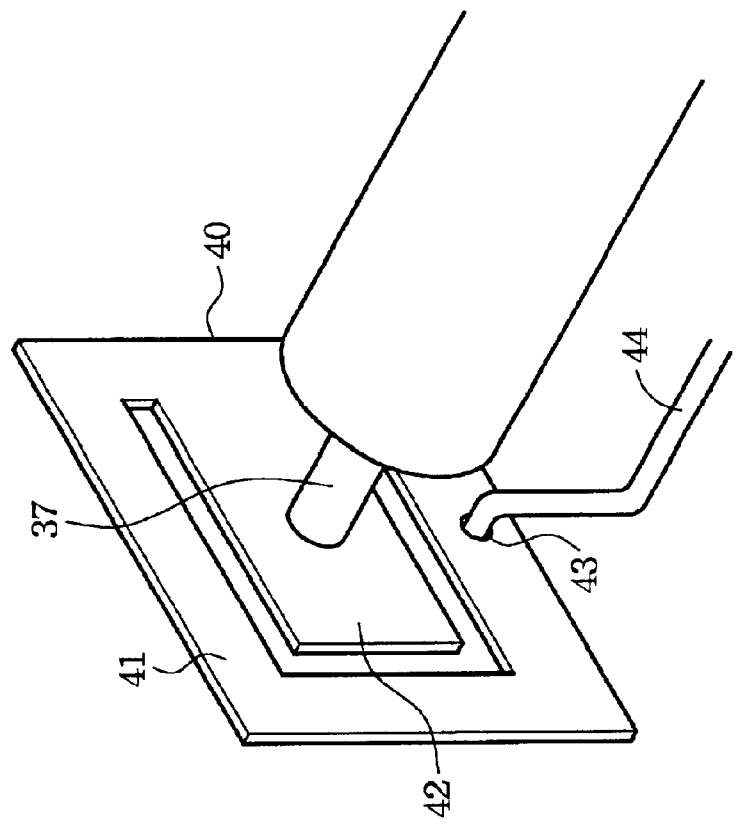
FIG. 5 is a schematic diagram showing that the brush transfers the power to the heating mechanism in accordance with the present invention.

Referring to FIG. 4, which is a schematic diagram of a brush structure, the brush 40 is constructed by a metal frame 41 and a flexible thin metal plate 42. The flexible thin metal plate 42 is mounted on the metal frame 41 and a power joint 43 is mounted on the metal frame 41 and is electrically connected to the power source by a wire 44. As shown in FIG. 5, which is a schematic diagram showing that the brush transfers the power to the heating mechanism, the power supplied from the power source is transferred through the wire 44 and the metal frame 41 to the flexible thin metal plate 42, and then the power is transferred through the power junction 37 to the heating mechanism since the flexible thin metal plate 42 contacts with the power junction 37 at the axle center of the rolling shaft.

Figure 6:
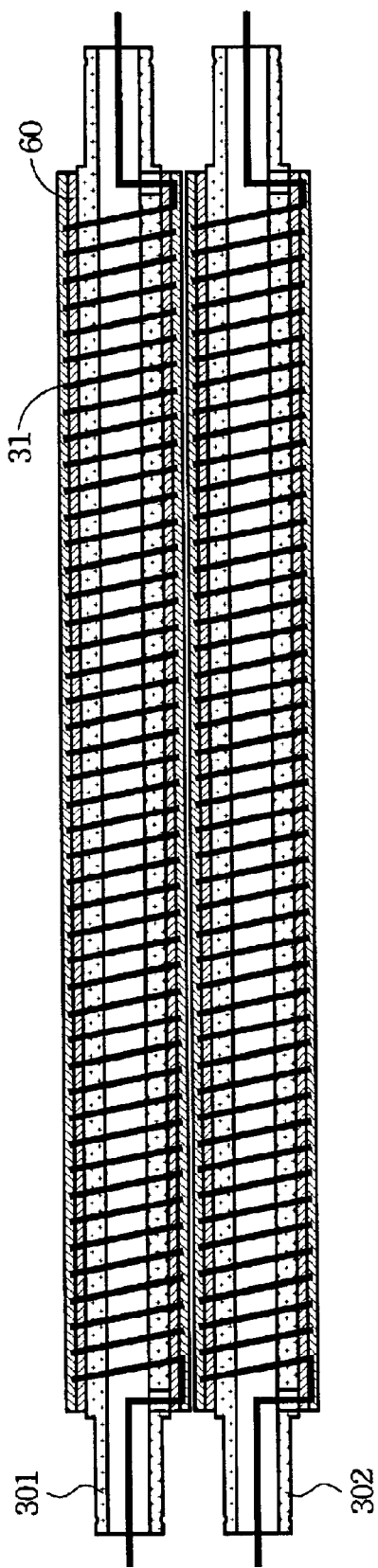
FIG. 6 is a schematic construction diagram of another roller heating system in accordance with the present invention.

Turn to FIG. 6, which is a schematic construction diagram of another roller heating system. In this embodiment, the first and second rolling shafts 301 and 302 are made of metal materials in place of the aforesaid hard plastic materials, and in order to prevent short-circuiting resulted from contact of the heating mechanism 31 (i.e. the electric heating wire) with the metal rolling shafts 301 and 302, the metal rolling shafts 301 and 302 are respectively covered with an insulating layer 60. The insulating layer 60 has a heat resistance characteristic and the silicon rubber is used as the insulating layer in this embodiment.

Figures 7A, 7B:
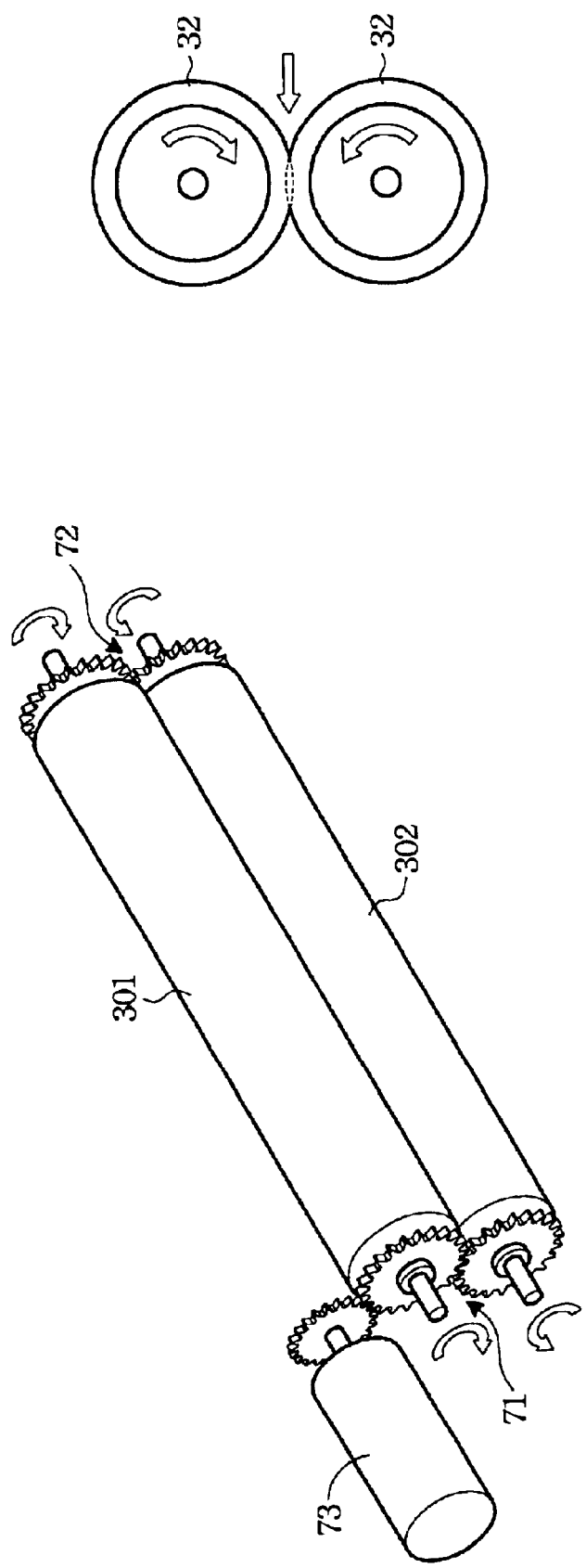
FIGS. 7A and 7B are schematic assembling diagrams of the first and second rolling shafts in accordance with the present invention.

Referring to FIGS. 7A and 7B, which are schematic assembling diagrams of the first and second rolling shafts, a first driver 71 and a second driver 72 respectively mounted at the ends of the first and second rolling shafts 301 and 302 of the roller heating system, and the first driver 71 is connected to a motor 73 which provides the first driver 71 with a dynamic force and the dynamic force is passed to the second driver 72 through the first driver 71 in such a way that the first and second rolling shafts 301 and 302 rotate synchronously.

The first driver and the second driver are respectively a set of variable speed gears for modulating the speed and direction of rotation outputted from the motor, and the rotation direction of the first rolling shaft is opposite to that of the second rolling shaft. The first driver 71 and the second driver 72 are respectively mounted at the ends of the first rolling shaft 301 and the second rolling shaft 302 in such a way that the heat conduction layers 32 respectively on the first and second rolling shafts interact with each other to produce a predetermined level of interferences so as to provide sufficient friction and compression to facilitate feeding and laminating the article covered with the laminating plastic films.

As a result of direct combination of the heating mechanism and the pair of rollers, the above-mentioned roller heating system for the laminating machine can simplify the assemblies of the laminating machine and also can achieve good temperature control and shorten the preheating time of the laminating machine so as to obtain a good lamination quality through simultaneous heating and compressing the laminating plastic film.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed:

1. A roller heating system for a laminating machine, which is adapted to heat and laminate a laminating plastic film of which the inner surface has a fusion gum to cohere to an article desired for lamination, said system comprises a pair of rollers, said pair of rollers include:

a first rolling shaft having a first electric heating wire wound around an outer periphery thereof and two first erection holes located on opposing ends thereof, the first electric heating wire having two first ends, each of the two first ends inserted into one of the two first erection holes;

a first heat conduction layer covering said first rolling shaft and said first electric heating wire;

a second rolling shaft located parallel to said first rolling shaft, the second rolling shaft having a second electric heating wire wound around an outer periphery thereof and two second erection holes located on opposing ends thereof, the second electric heating wire having two second ends, each of the two second ends inserted into one of the two second erection holes; and a second heat conduction layer covering said second rolling shaft and said second electric heating wire;

wherein, when said roller heating system for a laminating machine operates, said first rolling shaft and said second rolling shaft rotate in a predetermined direction and said laminating plastic film is then fed therebetween, heating said laminating plastic film respectively through said first heat conduction layer and said second heat conduction layer such that said fusion gum becomes molten and subsequently coheres to said article through the compression of said first and second rolling shafts.

2. The roller heating system for a laminating machine of claim, wherein said first and second rolling shafts are made of hard plastic materials.

3. The roller heating system for a laminating machine of claim 1, wherein said first heat conduction layer and said second heat conduction layer are heat resistance rubber.

4. The roller heating system for a laminating machine of claim 1, wherein said first heat conduction layer and said second heat conduction layer are silicon rubber.

5. The roller heating system for a laminating machine of claim 1, wherein said first rolling shaft and said second rolling shaft are made of metal materials and are respectively wrapped up with an insulating layer so as to prevent short-circuiting resulting from electrically contacting said first and second electric heating wires.

6. The roller heating system for a laminating machine of claim 5, wherein said insulating layer is heat resistance rubber.

7. The roller heating system for a laminating machine of claim 5, wherein said insulating layer is silicon rubber.

8. The roller heating system for a laminating machine of claim 1, further comprising a first driver and a second driver respectively mounted at ends of said first rolling shaft and said second rolling shaft, wherein said first driver is connected to a motor which provides said first driver with a dynamic force and said dynamic force is passed to said second driver through said first driver.

9. The roller heating system for a laminating machine of claim 8, said first driver and said second driver comprise a set of variable speed gears to modulate the rotating speed and direction provided by said motor and the rotation direction of said first rolling shaft is opposite to that of said second rolling shaft.

10. The roller heating system for a laminating machine of claim 8, wherein said first driver and said second driver are respectively mounted at the ends of said first rolling shaft and said second rolling shaft such that said first and second heat conduction layers interact with each other to produce a predetermined level of interferences so as to provide sufficient friction and compression to facilitate feeding and laminating said laminating plastic film.

11. A process for producing an electric heating wire rolling shaft, which is applied to a heat rolling shaft of which the lateral ends have a respective first and second erection hole, said process comprises the following steps:
   a. screw winding an electric heating wire from one end of said rolling shaft to the other end thereof;
   b. inserting said two ends of said electric heating wire respectively through said first and second erection holes connecting said two ends of said electric heating wire respectively with a power junction at the axle center of said rolling shaft; and
   c. said power junction is electrically connected to a power source.

12. The process for producing an electric heating wire rolling shaft of claim 11, wherein in said step a, said electric heating wire is wound in an equal spacing onto said heat rolling shaft.

13. The process for producing an electric heating wire rolling shaft of claim 11, wherein in said step c, said power junction is electrically connected to said power source by a brush.

14. The process for producing an electric heating wire rolling shaft of claim 13, wherein in said step c, said brush includes a metal frame and a flexible thin metal plate, said flexible thin metal plate is mounted on said metal frame and at least a power joint is mounted on said metal frame and is electrically connected to said power source, whereby the power from said power source is transferred through said metal frame to said flexible thin metal plate and then said flexible thin metal plate transfers said power in a contact manner to said power junction.

* * * * *